Nov. 17, 1964  A. W. GAUBATZ  3,157,028
BEARING DESIGN
Filed July 10, 1961

INVENTOR.
Arthur W. Gaubatz
BY
Robert E. McCollum
ATTORNEY

United States Patent Office 3,157,028
Patented Nov. 17, 1964

3,157,028
BEARING DESIGN
Arthur W. Gaubatz, Indianapolis, Ind., assignor to General Motors Corporation, Detroit, Mich., a corporation of Delaware
Filed July 10, 1961, Ser. No. 122,826
6 Claims. (Cl. 60—35.55)

This invention relates to a bearing construction, and more particularly to one that automatically compensates for unwanted rotative torque forces that may act on the bearing during rotation. This type of bearing construction has particular application in the field of vectoring rocket nozzles, as will appear later, but is equally applicable to many other pivotal bearing installations when unwanted rotative torque forces are present.

In the field of vectoring rocket or similar nozzles, the nozzle bends or deflects the jet exhaust stream when the nozzle is vectored. As a result, when the jet stream strikes the nozzle, a torque called a gas induced dynamic torque is created tending to straighten out the nozzle or urge it towards the center position. The forces attempting to vector the nozzle are therefore opposed by those tending to restore the nozzle to its unvectored position. The larger the restoring torque is, therefore, the heavier and stronger the actuators have to be to vector the nozzle. This is undesirable since weight is critical in rockets and similar constructions.

The bearing construction of this invention eliminates this difficulty upon vectoring of the nozzle by utilizing the gas induced axial loading to produce a torque that assists the forces attempting to actuate or vector the nozzle. Therefore, this invention relates to a bearing design wherein countertorque forces are produced to balance undesired torque forces acting on the bearing.

It is therefore an object of this invention to provide a bearing design producing rotative torque forces upon rotation of the bearing that assist movement of the bearing.

It is a further object of the invention to provide a bearing design consisting of relatively rotatable components interconnected by movable over center type force transmitting members that change the direction of application of forces on the bearing to produce a torque force assisting the rotative movement of the bearing.

Other objects, features and advantages of the invention will become apparent upon reference to the subsequent detailed description of the invention, and to the drawings illustrating the preferred embodiments thereof, wherein:

FIGURE 1 schematically illustrates a tilting rocket exhaust nozzle embodying the invention;

Figure 1:
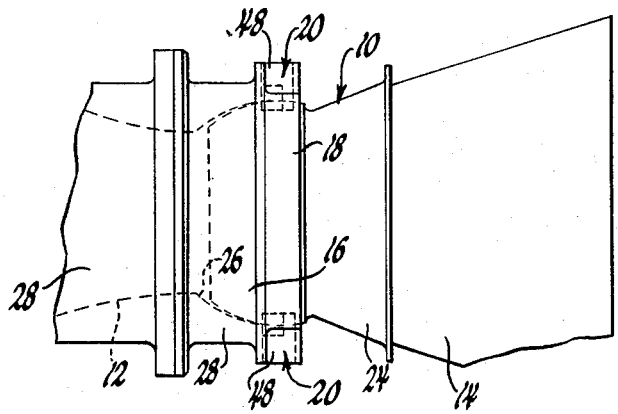

The drawings, and particularly FIGURE 1, show a gas jet exhaust nozzle 10 of the converging-diverging tilting type connected, in this particular instance, to the aft end of a rocket casing to form a rocket engine. In general, the nozzle has a stationary annular converging gas inlet portion 12 axially aligned with an annular diverging movable gas exit portion 14, and a throat section 16 of minimum cross sectional area formed at the point of juncture between the two. The movable portion 14 is pivotally supported on the stationary portion by a ring 18 and a pair of trunnion type mounts 20 to permit a 120° tilting of the movable portion in one plane about the fixed portion. Nozzle portion 14 is adapted to be tilted by a number of selectively operable hydraulic or other similar actuators (not shown) connected between the portions.

Figure 2:
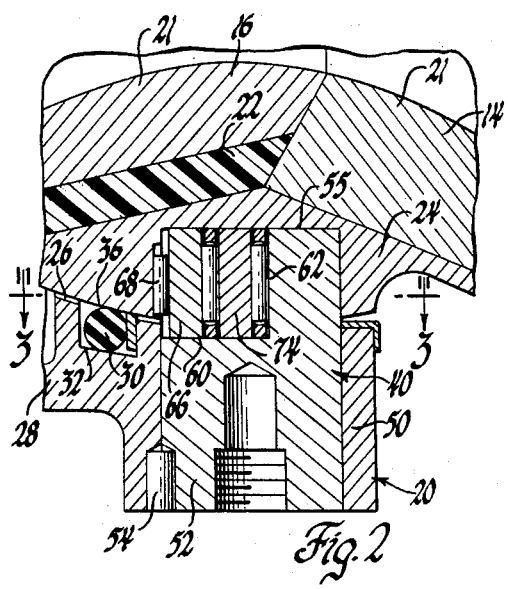
FIGURE 2 is an enlarged cross sectional view of a detail of FIGURE 1.

FIGURE 2 shows the nozzle throat construction more clearly. It has a sectioned annular convergent-divergent throat insert 20 of tungsten or the like, backed by an annular block of heat resisting insulating material 22 of Durez, for example. Block 22 is cemented to the nozzle housing 24 which is curved at its upstream end to conform to the mating surface 26 of the stationary nozzle casing portion 28 with which it cooperates during vectoring of the nozzle. Nozzle casing 28 has an annular O-ring type gas seal 30 seated in a groove 32 and bears against the movable nozzle surface 36. The seal prevents the leakage of gas outwardly from the nozzle throat to the bearings indicated generally at 40.

Further details of the rocket motor other than those directed to the trunnion mounts will not be given since they may be known and are believed to be unnecessary for an understanding of the invention. Suffice it to say, however, that the exhaust jet from the rocket motor passes axially through the nozzle 10 along the normal axial centerline of the nozzle, or is deflected in selective directions upon vectoring of the nozzle about the trunnion bearing means to be described. The passage of the gas stream through the throat section of the nozzle exerts a high pressure against the converging portion of the movable nozzle portion tending to push the movable nozzle section out of the fixed section. The gas induced axial loading on the bearings is therefore from left to right as seen in FIGURES 1 through 6.

In prior known vectoring nozzle installations using trunnion mounts, the movable nozzle portion was generally pivoted in one plane by means of a pin-in-a-bore combination fixed to the stationary nozzle portion. In these installations, however, the axial gas loading on the nozzle was always through the centerline of the movable nozzle portion, which had a fixed pivot on the pin. When the nozzle vectored, in a clockwise direction, for example, the deflected gas stream induced a dynamic torque on the nozzle acting counterclockwise to oppose the vectoring torque, and the axial loading contributed nothing in the way of a torque opposing the gas induced dynamic torque. This required the use of large nozzle actuators to overcome the dynamic torque. The bearing construction of this invention obviates this need for large actuators by essentially reducing the actuating force to only that necessary to overcome the weight and friction drag of the nozzle.

In general, this is accomplished as follows. Since a pinned link can transmit loads only along its centerline, in effect, an over center type pinned link is inserted between the movable and stationary bearing portions. It is so constructed and movable that when the nozzle is unvectored, the link centerline coincides with the normal axial centerline of the movable nozzle portion, and the principal axial load due to the gas flow is purely axial. Therefore, no additive torque forces are produced. However, when the nozzle is vectored clockwise, for example, as seen in the figures, the link in attempting to follow the center of thrust is caused to swing about its fixed pivot to a new position where its centerline is inclined with respect to the rotated centerline of the movable nozzle portion. Therefore, since the axial load acts in the direction of the rotated centerline of the movable nozzle section and through the inclined link centerline, a moment is created about the link pivot tending to rotate the link in a clockwise direction. The moment has a moment arm of distance L from the centerline of the link to a parallel line through the main reaction pivot point of the bearing. Therefore, the axial load provides a moment that is additive to the vectoring torque forces. The direction of application of force on the bearing is therefore progressively changed as the nozzle is vectored, thereby increasing or decreasing the moment arm and additive torque to balance any unwanted torque forces acting on the bearing.

Figure 3:
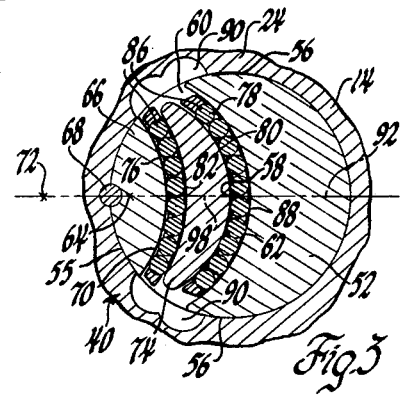
FIGURE 3 is a cross sectional view of the bearing of FIGURE 2 with the nozzle in the unvectored position taken on the lines indicated by and viewed in the direction of the arrows 3—3 of FIGURE 2.
Figure 4:
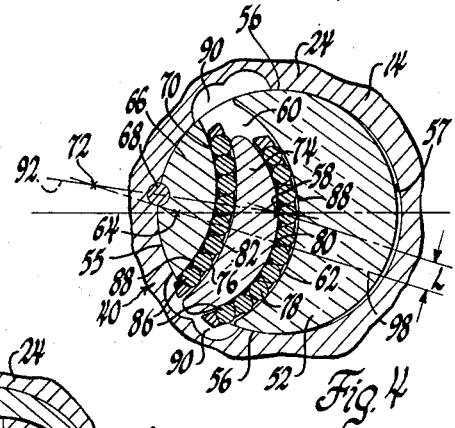
FIGURE 4 is a view corresponding to FIGURE 3 illustrating the bearing of FIGURE 3 in the nozzle vectored position.

More specifically, in FIGURES 2, 3 and 4, the stationary nozzle outer casing 28 has at each of two diametrically opposite locations 48 a boss 50 within which is fixed a trunnion pin 52. Since both trunnion mounts are of the same construction, only one will be described for clarity. The pin 52 is anchored to the casing by a dowel 54 and extends into a substantially circular recess 55 in the housing 24 of the movable nozzle portion. The recess 55 is made just large enough in diameter along the transverse axis to maintain a sliding line-to-line contact at locations 56 with pin 52; however, it is slightly ovaloid or elongated in the axial direction at 57 to allow a small clearance for a slight shifting of the pin as the nozzle vectors. The movable nozzle portion pivots about a relatively fixed point 58 on the pin 52.

A portion of the pin 52 that extends into the housing 24 is cut away to provide a recess 60. The remaining portion of the pin is provided with a concave surface 62 whose arc is generated about a center 64 fixed with respect to the pin. A concave-convex block 66 is pinned to the movable nozzle portion by a dowel 68 with its concave side mated to the curvature of the nozzle portion. The convex arcuate surface 70 of the block is generated about a center 72.

Between block 66 and pin 52 is a crescent shaped rocking block 74 slidingly wedged between the arcuate surfaces 70 and 62 by means of needle bearing assemblies 76 and 78 on opposite sides. The rocking block is adapted to be swung about its fixed pivot 64 upon vectoring of the nozzle. The arc 80 defining the curvature on one side of the block has a center at the fixed point 64, while the arc 82 of the opposite side is generated about the center 72. The needle bearing assemblies may be of known constructions each consisting of needle type rollers 86 aligned and supported within window sector type cages 88. The cages have curvatures corresponding to the surfaces they engage and are floatingly mounted between the blocks 66, 74 and pin 52 for a rolling pivotal movement about the respective centers 64 and 72. The movable nozzle housing 24 has pockets 90 to accommodate the movement of the needle bearing assemblies and block 74 upon vectoring of the nozzle.

In operation, when the nozzle is vectored, the movable nozzle portion centerline 92 is swung clockwise about the fixed pivot 58 on pin 52 from its horizontal position in FIGURE 3 to the position indicated in FIGURE 4, and the axial thrust load acts along this line from left to right. Due to the geometry of the arcuate surfaces described, rotation of the movable nozzle portion and block 66 drives or forces the block 74 to follow the center of thrust and pivot about its fixed center 64. It therefore swings or slides downwardly along with the needle bearing assemblies from the position on FIGURE 3 to assume the position shown in FIGURE 4. At this point, the centerline 98 of the rocking block has moved from a position coinciding with the nozzle portion centerline 92 to the position indicated in FIGURE 4. The rocking block centerline is therefore inclined with respect to the direction of application of the axial load along the movable nozzle portion centerline. Since the load can only be transmitted through the link along its centerline, a clockwise moment is therefore set up by the load acting about the rocking block pivot 64 at a distance L from a parallel line through the movable nozzle portion pivot 58. This moment is then in the same direction of and additive to the vectoring torque forces. The torque arm L is very nearly proportional to the vector angle. Since the unwanted gas induced dynamic torque, which is acting counterclockwise, is also substantially proportional to the vector angle, the additive torque or counter torque created by this construction substantially balances the gas dynamic torque. It is to be noted that the inclination of the rocking block producing this additive moment also produces a side thrust on the bearing; however, this is taken care of by the line-to-line contact between the movable nozzle housing surface and the pin surface at locations 56.

Therefore, in bearing installations, the centers of curvatures of the parts will be so chosen that the additive torque produced will substantially balance any unwanted rotational torque acting on the bearing. In this particular installation, as pointed out, the geometry will be such that the additive torque substantially balances out the gas dynamic torque restoration forces induced on the nozzle by the deflected gas stream.

It will be seen therefore that the additive torque produced by the shifting of rocking block 74 varies progressively with a change in the vectoring of the movable nozzle portion. It either increases or decreases as the case may be to substantially balance the oppositely acting rotational torque forces acting on the bearing, thereby materially reducing the torque necessary to vector the nozzle.

Figure 5:
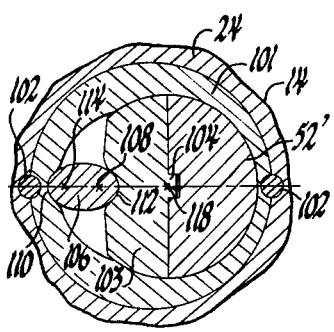
FIGURE 5 is a cross sectional view of a modification of the FIGURES 3 and 4 embodiments illustrating the bearing in the nozzle unvectored position.
Figure 6:
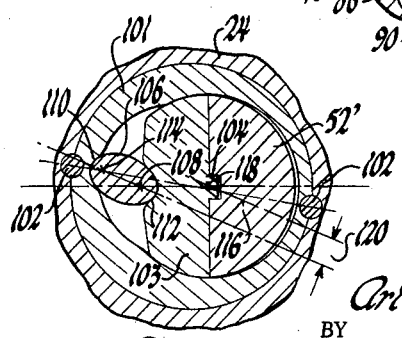
FIGURE 6 is a view corresponding to FIGURE 5 illustrating the FIGURE 5 modification in the nozzle vectored position.

FIGURES 5 and 6 show a modification of the FIGURES 1 through 4 embodiment, illustrating an over-center type compression link. However, the principle of operation remains the same. Therefore, only the parts necessary for an understanding of the embodiment will be described.

In FIGURE 5, the pin 52' is rotatably surrounded by a ring 101 fixed to the movable nozzle portion by dowels 102, and has a spacer 103 secured to it by a slotted connection 104. Between the spacer and the ring 101 is an oval shaped rocking strut 106 having a fixed pivot at 108 and edge arcs 110 and 112 generated about center 114 and pivot 108 corresponding to similar curvatures on the spacer and ring. As the nozzle vectors clockwise to the position in FIGURE 6, strut 106 pivots clockwise over center about its fixed point 108. The axial gas loading therefore causes a torque of moment arm length 120 from the strut centerline to a parallel line 116 through the pivot axis 118 of the ring and movable nozzle portion. A clockwise additive or counter torque therefore is created to balance the unwanted torque acting in an opposite or counterclockwise direction on the rotating nozzle portion. In all other respects, the embodiment of FIGURES 5 and 6 behaves in the same manner as that of FIGURES 1 through 4.

While the rocking strut 106 is shown as having rounded edges, in practice it would be provided with knife edges for better movement with less friction and other losses.

The invention has been described in connection with a tilting gas jet exhaust nozzle; however, it will be clear to those skilled in the arts to which this invention pertains that many modifications may be made thereto and that the invention may be used in many installations other than that illustrated where unwanted rotative torque forces are present without departing from the scope of the invention.

What is claimed is:

1. A bearing structure comprising a fixed bearing member and another bearing member under load surrounding and engaging said fixed member and mounted for a rotatable movement about a first fixed axis on said fixed member, and member interconnecting means mounted between and engaging said members and mounted for a pivotal movement about a second axis fixed with respect to and remote from the first fixed axis, said means comprising a strut fulcrumed on said second axis and having its opposite ends each operatively engaging one of said members and pivotally movable about its fulcrum upon rotation of said another member, said members and means in one relatively rotatable position having the first and second axes aligned with the line of application of force on said members and means due to said load, rotation of said another member pivoting said strut to change the line of application of force inducing an additional rotative force on said another member.

2. A bearing structure comprising a fixed bearing member and another bearing member under load surrounding and engaging said fixed member and mounted for a rotatable movement about a first fixed axis on said fixed member, and member interconnecting means mounted between and engaging said members and mounted for a pivotal movement about a second axis fixed with respect to and remote from the first fixed axis, said fixed member and means having mating arcuate engaged surfaces generated about the second fixed axis, said means comprising a crescent shaped strut having another arcuate surface slidable on a mating arcuate surface on said another member for the sliding of said element between said member surfaces, the members and means in one relatively rotative position having the first and second axes aligned with the line of application of force on said members and means due to said load, rotation of said another member slidably swinging said element about said second axis to a different position between said members to change the line of application of force inducing an additional rotative force on said another member.

3. A bearing structure comprising a fixed bearing member and another bearing member under load surrounding and engaging said fixed member and mounted for rotatable movement about a first fixed axis in said fixed member, and member interconnecting means mounted between and engaging said members mounted for a pivotal movement about a second axis fixed with respect to and remote from the first fixed axis, said interconnecting means comprising a member which engages both the fixed bearing member and said another member and rotates such that the line of application of force is changed resulting in an additional rotational force on the said another member.

4. The combination comprising a body having an outlet, a nozzle mounted on the body and adapted to discharge fluid from said outlet, and support means pivotally mounting the nozzle on the body for vectoring action about a vertical axis perpendicular to the nozzle, the support means being adapted to act against the fluid induced thrust on the vectored nozzle and thereby provide a reaction force to support the vectoring motion of the nozzle away from the axis, the support means comprising a first pivot between the nozzle and the body, a connecting member, a second pivot between the connecting member and the nozzle, and a third pivot between the connecting member and the body, said pivots being substantially parallel and mutually spaced.

5. The combination comprising a body having an outlet, a nozzle mounted on the body and adapted to discharge fluid from said outlet, and support means pivotally mounting the nozzle on the body for vectoring action about a vertical axis perpendicular to the nozzle, the support means being adapted to react against the fluid induced thrust on the vectored nozzle and thereby provide a reaction force to support the motion of the vectored nozzle away from the axis, the support means comprising a fixed cylindrical pin means over which is mounted and about which rotates the bearing surface of the nozzle, a concave-convex block attached to the rotating nozzle bearing surface and residing in an arcuate opening in the fixed cylindrical pin means, a concave-convex connecting block slidably mounted with needle bearing means on both of its surfaces between the fixed cylindrical pin and the rotating block fixed to the nozzle, said connecting block shifting with rotations of the nozzle thereby causing the reaction force supporting the vectoring action.

6. The combination comprising a body having an outlet, a nozzle mounted on the body and adapted to discharge fluid from said outlet, and support means pivotally mounting the nozzle on the body for vectoring action about a vertical axis perpendicular to the nozzle, the support means being adapted to react against the fluid induced thrust on the vectored nozzle and thereby provide a reaction force to support the motion of the vectored nozzle away from the axis, the support means comprising a fixed cylindrical pin means rotatably surrounded by a ring which is fixed to the movable nozzle bearing surface by dowels, an oval-shaped strut residing between the fixed cylindrical pin and the rotatable ring and connected to each other by means of receiving grooves, said strut rotating about its own axis as the nozzle and ring rotate thereby setting up the reaction force supporting the vectoring action.

References Cited in the file of this patent

UNITED STATES PATENTS

| 1,588,993 | Rahn | June 15, 1926 |
| 2,612,415 | Williams | Sept. 30, 1952 |
| 2,617,691 | Bechler | Nov. 11, 1952 |
| 2,653,062 | Sperisen | Sept. 22, 1953 |
| 3,048,977 | Geary | Aug. 14, 1962 |